United States Patent
Khosravy et al.

(10) Patent No.: US 8,059,027 B2
(45) Date of Patent: Nov. 15, 2011

(54) CORRECTING GPS THROUGH SECONDARY SENSORS AND SIGNAL STRENGTH

(75) Inventors: Moe Khosravy, Bellevue, WA (US); Lev Novik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 389 days.

(21) Appl. No.: 12/344,820

(22) Filed: Dec. 29, 2008

(65) Prior Publication Data

US 2010/0164787 A1    Jul. 1, 2010

(51) Int. Cl.
G01S 19/42 (2010.01)
G01S 19/03 (2010.01)
G01S 19/34 (2010.01)

(52) U.S. Cl. ............ 342/357.25; 342/357.4; 342/357.74

(58) Field of Classification Search ............ 342/357.74, 342/461, 357.23, 451, 357.25, 357.4, 357, 342/74; 455/441
See application file for complete search history.

(56) References Cited

U.S. PATENT DOCUMENTS

| | | | | |
|---|---|---|---|---|
| 4,912,645 | A * | 3/1990 | Kakihara et al. | 701/208 |
| 6,084,542 | A * | 7/2000 | Wright et al. | 342/357.31 |
| 6,427,077 | B1 * | 7/2002 | Alberth et al. | 455/456.1 |
| 6,462,706 | B2 * | 10/2002 | Decker | 342/357.23 |
| 6,584,331 | B2 * | 6/2003 | Ranta | 455/574 |
| 6,853,840 | B2 * | 2/2005 | Najafi | 455/410 |
| 6,861,982 | B2 | 3/2005 | Forstrom et al. | |
| 7,053,830 | B2 | 5/2006 | Krumm | |
| 7,117,087 | B2 * | 10/2006 | Jung et al. | 701/213 |
| 7,136,751 | B2 | 11/2006 | Pinto et al. | |
| 7,199,754 | B2 | 4/2007 | Krumm | |
| 7,250,907 | B2 * | 7/2007 | Krumm et al. | 342/451 |
| 7,257,417 | B1 * | 8/2007 | Krasner | 455/456.3 |
| 7,260,378 | B2 * | 8/2007 | Holland et al. | 455/404.2 |
| 7,409,188 | B2 * | 8/2008 | Syrjarinne et al. | 455/13.4 |
| 7,532,113 | B2 | 5/2009 | Krumm | |
| 2005/0181810 | A1 | 8/2005 | Camp et al. | |
| 2006/0038555 | A1 | 2/2006 | Higgins et al. | |
| 2006/0119507 | A1 * | 6/2006 | Cawse | 342/357.13 |
| 2006/0119508 | A1 * | 6/2006 | Miller | 342/357.17 |
| 2006/0238347 | A1 | 10/2006 | Parkinson et al. | |
| 2007/0005363 | A1 | 1/2007 | Cucerzan et al. | |
| 2007/0006098 | A1 | 1/2007 | Krumm et al. | |
| 2007/0258420 | A1 * | 11/2007 | Alizadeh-Shabdiz et al. | 370/338 |
| 2008/0165737 | A1 | 7/2008 | Uppala | |

FOREIGN PATENT DOCUMENTS

EP    1710599    10/2006

OTHER PUBLICATIONS

Krumm et al, "LOCADIO: Inferring Motion and Location from Wi-Fi Signal Strengths," Proceedings of Mobiquitous 2004, pp. 4-14, Aug. 22-26, 2004.*

(Continued)

Primary Examiner — Gregory C Issing
(74) Attorney, Agent, or Firm — Workman Nydegger

(57) ABSTRACT

Systems and methods that mitigate errors in positioning systems, by employing signal strength(s) of signal sources (e.g., towers adjacent to a mobile unit.) Such mitigation system verifies whether the mobile unit receiving GPS data is in static position (e.g., not moving) or is moving (e.g., dynamic position), and evaluates accuracy of the GPS reporting (e.g., discarding GPS data in static position and trusting GPS data in dynamic position).

19 Claims, 10 Drawing Sheets

OTHER PUBLICATIONS

Girod, et al. The Design and Implementation of a Self-Calibrating Distributed Acoustic Sensing Platform. http://lecs.cs.ucla.edu/~girod/papers/sensys06.pdf. Last accessed Oct. 8, 2008.

Adel, et al. Salam: A Scalable Anchor-Free Localization Algorithm for Wireless Sensor Networks. http://www.lib.umd.edu/drum/bitstream/1903/3496/1/umi-umd-3326.pdf. Last accessed Oct. 8, 2008.

Global Positioning Systems. http://www.squidoo.com/globalpositioningsystem. Last accessed Oct. 8, 2008.

Vlasic, et al. Practical Motion Capture in Everyday Surroundings. http://people.csail.mit.edu/wojciech/MoCap/PMC.pdf. Last accessed Oct. 8, 2008.

* cited by examiner

CORRECTING GPS THROUGH SECONDARY SENSORS AND SIGNAL STRENGTH

BACKGROUND

Advances in computer technology (e.g., microprocessor speed, memory capacity, data transfer bandwidth, software functionality, and the like) have generally contributed to increased computer application in various industries. For example, today, cellular telephones running on state-of-the-art operating systems have increased computing power in hardware and increased features in software in relation to earlier technologies.

For instance, cellular telephones are often equipped with built-in digital image capture devices (e.g., cameras) and microphones together with computing functionalities of personal digital assistants (PDAs). Since these devices combine the functionality of cellular telephones with the functionality of PDAs, they are commonly referred to as "smartphones." The hardware and software features available in these smartphones and similar technologically capable devices provide developers the capability and flexibility to build applications through a versatile platform. The increasing market penetration of these portable devices (e.g., PDAs) inspires programmers to build applications, Internet browsers, etc. for these smartphones.

Moreover, the Internet continues to make available ever-increasing amounts of information, which can be stored in databases and accessed therefrom. Additionally, with the proliferation of portable terminals (e.g., notebook computers, cellular telephones, PDAs, smartphones and other similar communications devices), users are becoming more mobile, and hence, trackable with respect to buying habits and locations that they tend to frequent. For example, many devices are being designed with a geographic location tracking technology such as GPS for reasons of safety, finding travel destinations, and the like. Thus, it now becomes possible to determine the location of the user.

Location identification systems are used in many aspects of everyday life. By way of example, it has become increasingly more common for GPS to be integrated into automobiles to assist in navigation. Generally, a GPS system can, by triangulation of signals from three satellites, pinpoint a current location virtually anywhere on earth to within a few meters.

Knowledge of where the user has traveled can be of value to the user and to companies that seek to benefit economically by knowledge of the user location by providing location-based data and services to the user. As such, location-based services use knowledge of a user location to index into services and data that are likely to be useful at that location. For example, many modern handheld devices are equipped with multiple sensors (e.g., microphone, wireless transmitter, global positioning system—GPS—engine, camera, stylus, and the like), which are notified regarding local activities/services. Such can include reminder applications, which can supply user's relevant information at a given location, such as "You're near a grocery store, and you need milk at home." Other conventional applications such as geo-based reminders; and "electronic graffiti" systems can support a user who chooses to leave electronic notes (for oneself or others) that are associated with a particular location, such as "There is a better Thai restaurant one block north of here." Additionally, location-based tour guide applications offer relevant information about an exhibit or site at which the user is standing. These and most other location-based services share a need for a custom database dedicated to storing and serving data for specified locations.

GPS relies on satellite visibility to determine a user's position on the ground. Typically, for scenarios where a user is static or standing still, the portable GPS tracker devices and readers are required to indicate that they are at such static position—otherwise, substantial errors can be induced in various positioning applications such as distance and path finding calculations. Conventional corrections for such errors are typically based on multi-lateration or triangulation techniques between source positions, which determine if the movement is due to movement of the mobile unit, or whether such perceived movement indicates GPS errors. Such calculations can also become very intensive and hence employ system resources that could have been used more efficiently for other tasks.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation mitigates errors in positioning systems, by employing signal strength(s) of signal sources (e.g., towers adjacent to a mobile unit; other mobile units, and the like) to verify whether such unit is in static position (e.g., not moving) and evaluate accuracy of the GPS reporting (e.g., discarding GPS data indication.) A detection component can detect strength of an incoming signal from a signal source to the mobile unit and a comparator component can compare strength of such signal to a strength thereof at a predetermined time, to infer whether such mobile unit is static or in motion.

As such, a constant signal strength during a predetermined period can be inferred to indicate static (e.g., non-moving) mobile unit. Likewise, a change in signal strength during a predetermined period can be inferred to indicate that the mobile unit has moved. Such detection component and the comparator component can be part of the mobile unit, or can be positioned as part of a central control system that further employs triangulation procedures to infer whether the mobile unit is static or in motion. Such becomes important in applications that employ GPS data for verifying distances travelled as the GPS indicates erratic motion within vicinity of the point where the mobile device has stopped, and hence are introduced. Other motion detector devices (e.g., accelerometers, speedometers, altimeters and the like) can be further be employed to detect motion and hence validate reliance on GPS data.

In a related methodology, initially a signal emitting from a tower adjacent to the mobile unit can be detected. Subsequently, strength of such signal can be compared to a signal received from the same tower by the mobile unit. If differences (e.g., an absolute difference) between such signal strengths are outside a predetermined range, then it can be inferred that the mobile unit is in fact in motion, and hence GPS data can be trusted. Otherwise, the GPS data can be discarded, since a static position is inferred. Put differently, the GPS data can be inferred to be erratic, and hence not reliable if difference of signal strengths are within the predetermined threshold for a given time period.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
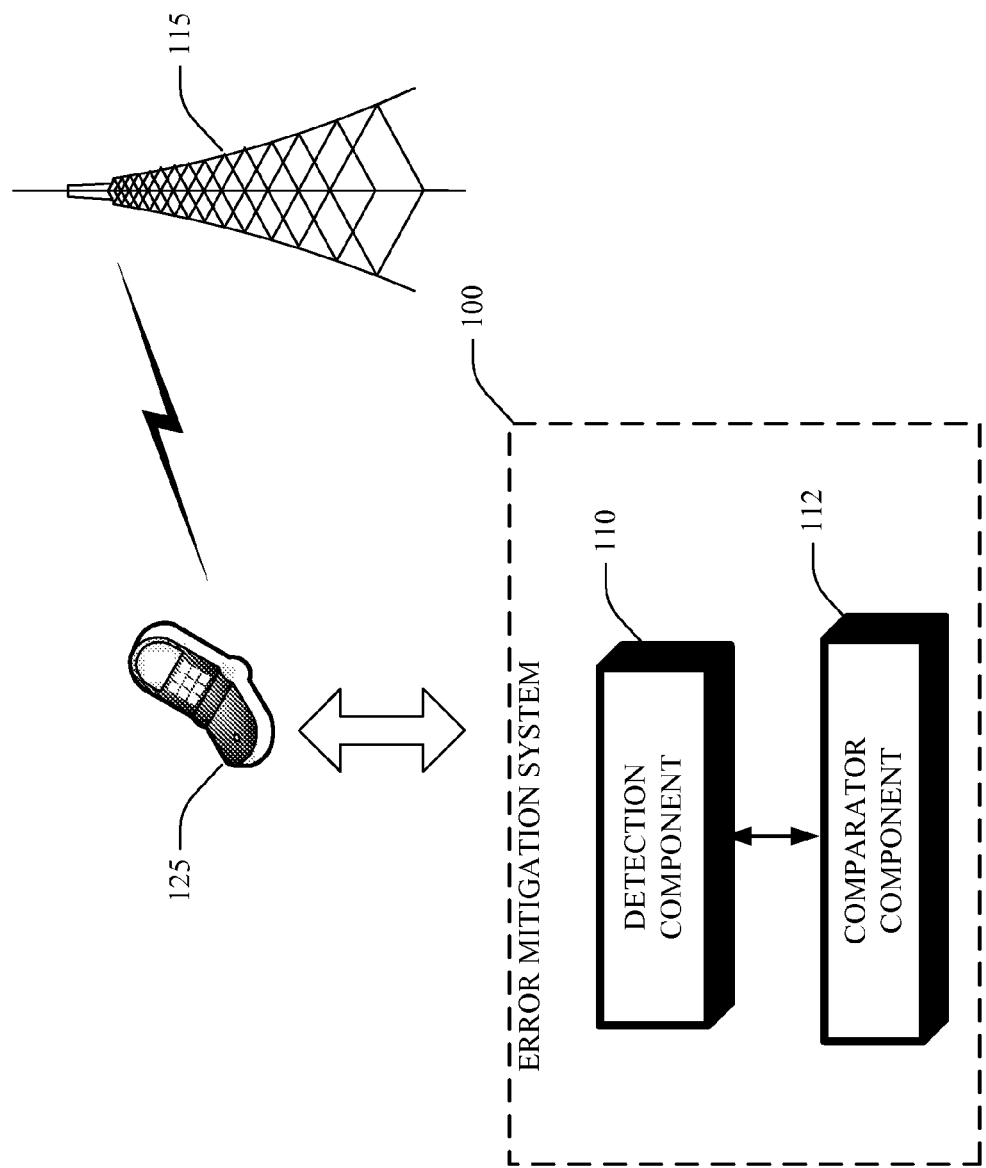
FIG. 1 illustrates a system that mitigates GPS errors according to an aspect of the subject innovation.

FIG. 1 illustrates a block diagram of an error mitigation system 100 that mitigates GPS errors in positioning system according to an aspect of the subject innovation. The system 100 employs signal strengths of communication tower(s) 115 (e.g., an adjacent tower) to verify whether a mobile unit 125 is not moving (e.g., in a static position). Such verification can evaluate accuracy of the GPS reporting and hence can discard GPS data indication. It is to be appreciated that the subject innovation is not limited to evaluating signal strengths received from a communication tower, and can be implemented in conjunction with any signal source such as signals received from other mobile units, and the like.

The tower 115 can be communicatively coupled to other public or private networks, which enable transfer of information to and from mobile units with GPS capabilities. For example, the communication networks can typically include a plurality of base stations that provide wireless communication links to mobile communication devices. Such base stations may be stationary (e.g., fixed to the ground) or mobile and positioned to provide wide area coverage as the mobile communication device travels across different coverage areas.

Moreover, the mobile unit 125 with GPS capabilities can employ directional or adaptive antennas. Directional and/or adaptive antennas are typically used to direct signal transmissions in a desired direction. For example, by using such antennas during transmission, the directional concentration of radiated energy beamed towards a receiver significantly increases the amount of received power per unit of transmitted power. This generally improves the throughput rate of the transmitter-to-receiver link and allows higher rates of information transfer.

As the mobile unit 125 moves around in the coverage area of the wireless network, it can come within range of other base stations that can provide a more optimal communication link than its existing link, which can be employed to verify static or dynamic motion. Therefore, communication device 125 can include a mechanism to periodically, continuously, or sporadically monitor if a better base station exists than its current base station.

Upon selection of a base station or communication tower 115 that supplies a signal to the mobile unit 125, the error mitigation system 100 employs such signals to verify movement for the mobile unit 125. As illustrated, the error mitigation system 100 includes a detection component 110 and a comparator component 112. The detection component 110 can detect strength of an incoming signal to the mobile unit 125 at different times such as signal strength $S_1$ at time $T_1$ and signal strength $S_2$ at time $T_2$. By comparing $S_1$ and $S_2$ the comparator can determine whether the signal strength has changed (e.g., beyond a predetermined threshold), and based thereon the error mitigation system 100 infers whether movement has occurred for the mobile unit 125. The signal strength can be a received signal level or field strength; or be in the form of a relative/unit-less index that corresponds to magnitude of an electric field at a reference point (e.g., number of "bars" on a cell phone screen.) As such, a constant signal strength during a predetermined period can be inferred to indicate static (e.g., non-moving) mobile unit. Likewise, a change in signal strength during a predetermined period can be inferred to indicate that the mobile unit has moved. Such detection component and the comparator component can be part of the mobile unit, or can be positioned as part of a central control system that further employs triangulation procedures to infer whether the mobile unit is static or in motion. Such becomes important in applications that employ GPS data for verifying distances travelled as the GPS indicates erratic motion within vicinity of the point where the mobile device has stopped, and hence are introduced. Other motion detector devices (e.g., accelerometers, speedometers, and the like) can be further be employed to detect motion and hence validate reliance on GPS data. As will be described in detail infra, besides using signal strength related metrics, the mobile unit can also employ motion sensors/analyzers to verify whether mobile unit is in motion.

Figure 2:
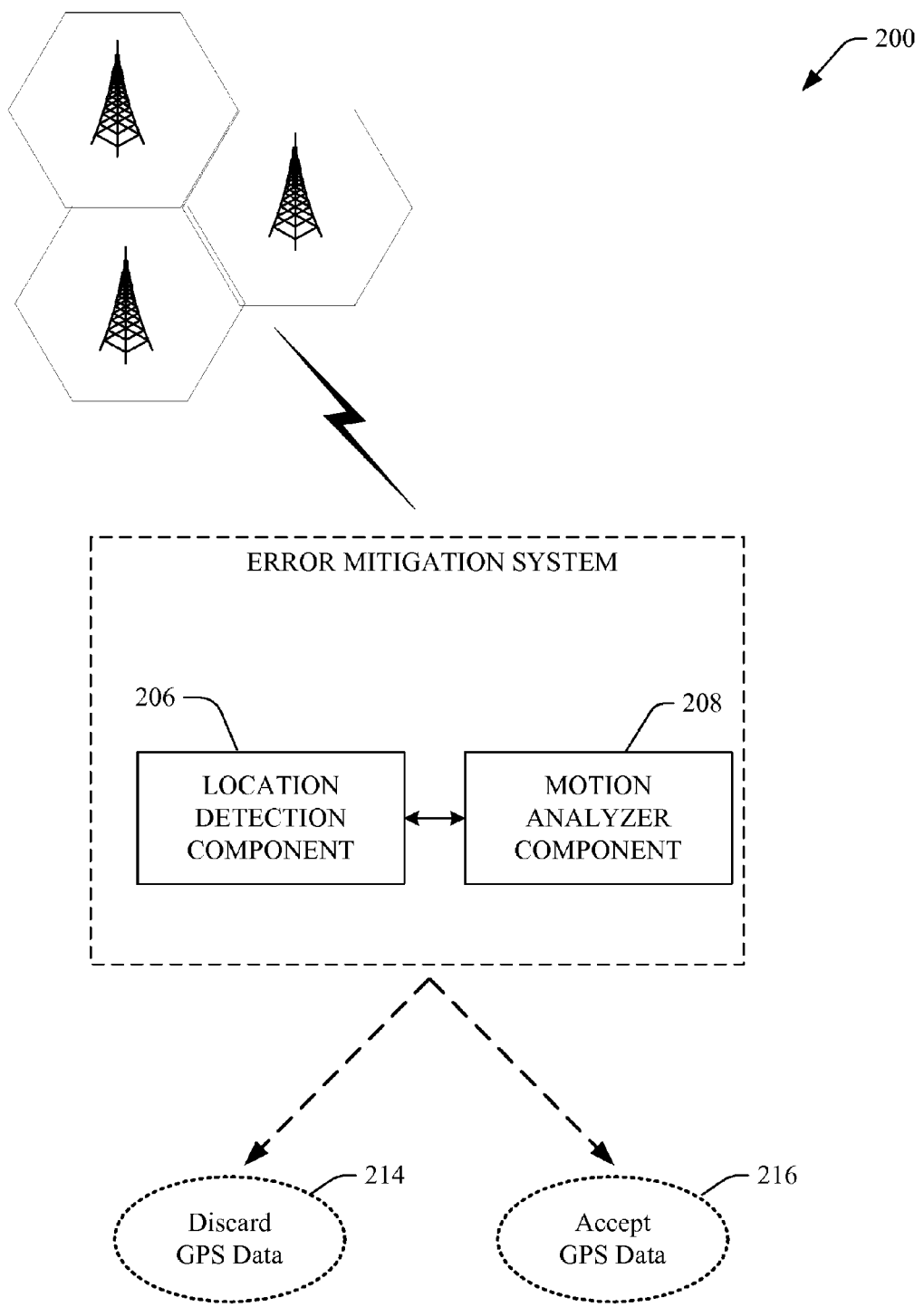
FIG. 2 illustrates an error mitigation system according to a further aspect of the subject innovation.

FIG. 2 illustrates an error mitigation system 200 according to a further aspect of the subject innovation. The error mitigation system 200 can affect identification and/or generation of location-based data and services. Generally, system 200 can include a location detection component 206 and a motion analyzer component 208. The location detection component 206 facilitates identifying and providing content that corresponds to a location of a portable device. In accordance therewith, the location detection component 206 can facilitate identifying a location of a device and thereafter can identify data and/or services that correspond to the location. Likewise, the motion analyzer component 208 can include devices such as accelerometers, speedometers and the like, wherein a motion of the mobile unit is detected. Based on such detection for analyzing motion of the mobile unit the GPS data can be trusted and hence accepted at 216, or otherwise discarded at 214. For example, if no motion is detected either through the motion analyzer component 208 or as a result of the detection and comparator components of FIG. 1, then the GPS data cannot typically be relied upon and GPS discarded. Alternatively, if motion is detected by the motion analyzer component and/or via the signal strength analysis of FIG. 1, then an inference can be made regarding motion of the mobile unit and hence GPS data can be accepted.

As explained earlier, the geographic location data is determined by the location detection component 206 via receiving geographic location signals of a GPS (global positioning system) technology. For example, GPS can consist of a constellation of twenty-four satellites each in its own orbit approximately 11,000 miles above the earth. Each of the satellites orbits the earth in about twelve hours, and the positions of which are monitored by ground stations. The satellites can include atomic clocks for extremely accurate timing (e.g., within three nanoseconds of each other) that provides the capability to locate the location detection component 206 (e.g., a handheld terrestrial receiver) on the earth within, in some applications, one meter resolution.

The GPS location data can be received via the location detection component 206 that is, for example, a wireless assisted GPS (WAGPS) device such as a GPS-enabled cellular telephone, GPS-enabled PDA, and the like. Such WAGPS facilitates the transmission of the GPS location data from the location detection component 206 to a remote location. Generally, this can occur through a cellular network where the location component is a cellular telephone, to an IP network (e.g., the Internet), and terminating at the remote location, node or device on the Internet or on a subnet thereof.

When receiving geographic location signals from several of the GPS satellites, the location detection component 206 can calculate the distance to each satellite of the communicating satellites and then calculate its own position, on or above the surface of the earth. However, when the signals are interrupted or degraded due to terrestrial structures, such interrupt time and position information can be useful in determining GPS shadow. A shadow is an area of communications interruption or total signal blockage. In the context of GPS, shadows are areas where a terrestrial receiver cannot receive adequate GPS signals due to signal blockage or degradation by any of many types of structures that include buildings, bridges, trees, hills, water (when submerged) and tunnels, for example. Such shadow information can be utilized in accordance with the subject invention, and is described infra.

It is to be appreciated, that the geographic location technology and/or motion detection technology can also include, for example, WiFi triangulation, cellular telephone triangulation, radio frequency signal strengths, and digital television signals.

Figure 3:
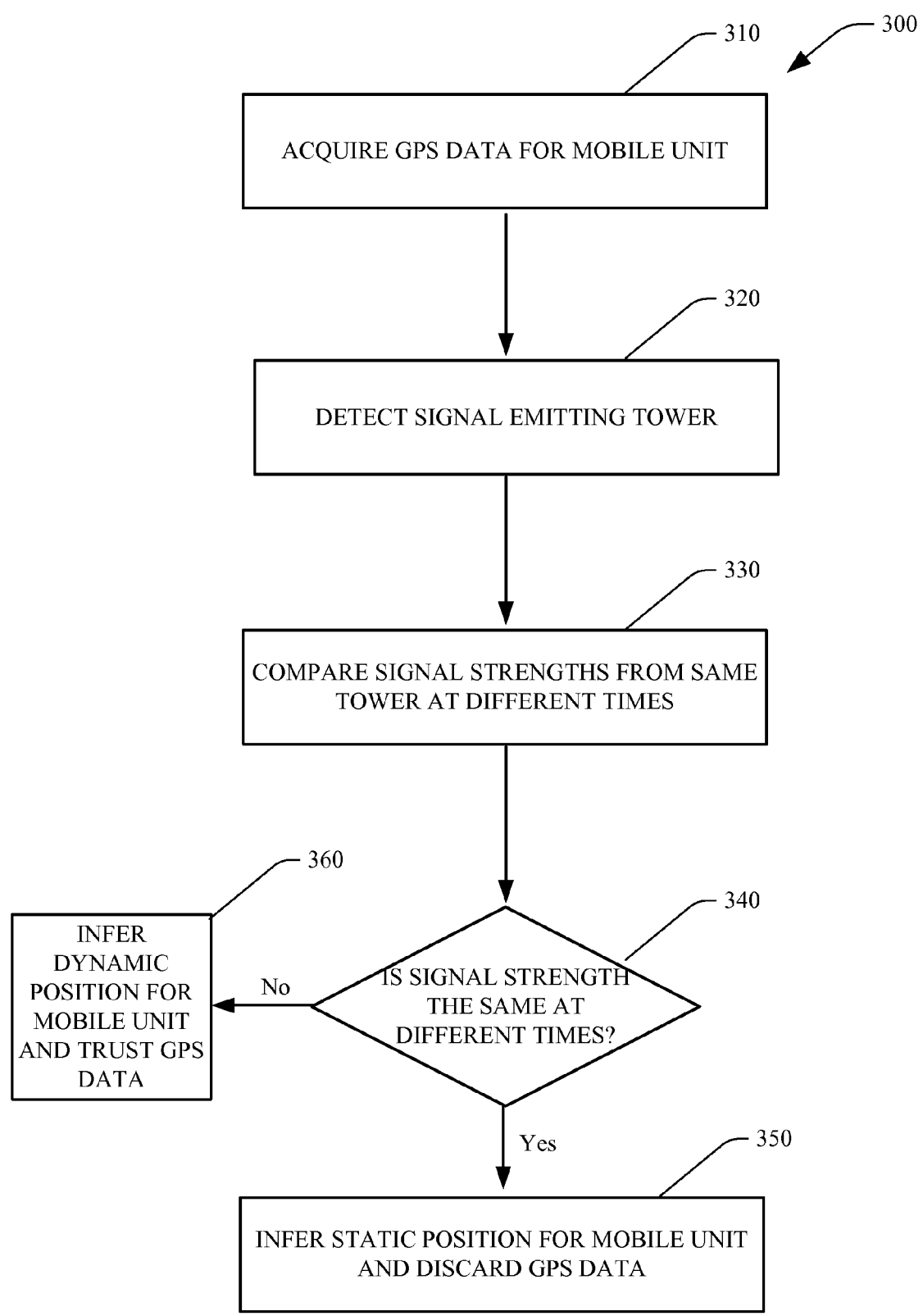
FIG. 3 illustrates a methodology of evaluating accuracy for GPS data based on whether a mobile unit is in motion or not via evaluating signal strengths.

FIG. 3 illustrates a methodology 300 of evaluating accuracy of GPS data based on whether a mobile unit is in motion or not via evaluating signal strengths. Such signal strengths can be received from adjacent towers, to verify whether a mobile unit is not moving and in a static position. Such verification can evaluate accuracy of the GPS reporting and hence can discard GPS data indication. For example, mitigating GPS errors becomes important in applications that employ GPS data for verifying distances travelled by the mobile unit, and hence once static the GPS indicates erratic motion within vicinity of the point where the mobile device has in fact stopped—and hence errors are introduced. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially and at 310 GPS data for a mobile unit can be acquired by the mobile unit and employed as input to applications being run thereby (e.g., applications measuring total distance travelled.) Next and at 320 a signal emitting from a tower adjacent to the mobile unit can be detected. Subsequently and at 330 strength of such signal can be compared to a signal received from the same tower by the mobile unit at a subsequent time. At 340, a determination is made whether signal strength is the same at time $T_1$ as compared to time $T_2$. If so, the methodology 300 infers a static position for the mobile unit and rejects GPS data at 350. Otherwise, the methodology 300 proceeds to act 360 wherein a dynamic position is inferred and GPS data accepted.

Figure 4:
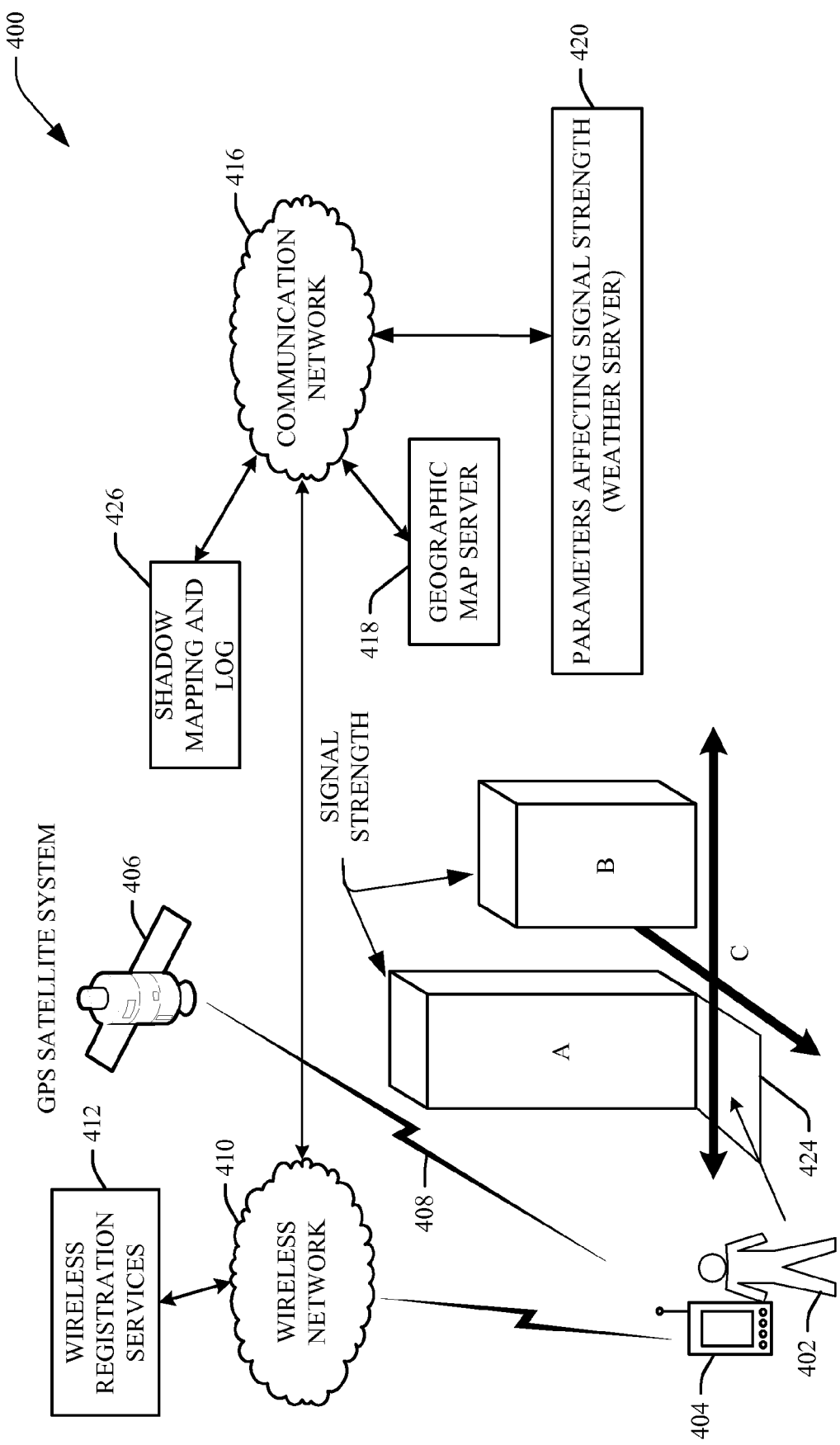
FIG. 4 illustrates a block diagram for a system that employs location and signal strength awareness according to a further aspect of the subject innovation.

FIG. 4 illustrates a block diagram for a system 400 that employs location and signal strength awareness. The system 400 employs GPS, such that a user 402 operating a device 404 can be located according to lat/long data derived therefrom. A GPS satellite system 406 continually communicates GPS signals 408 to the device 404 so that the device 404 can compute the lat/long data for the user. If the device 404 is a WAGPS device, the device 404 can register with a cellular network 410 having disposed therewith a wireless registration services system 412 that registers and uniquely identifies the user subscribed to that device 404. Once the device/user location is known via the GPS, the coordinates can be employed as search terms for search engines to identify adjacent towers of the communication network 416.

Thus, returned search links can be accessed according to some predetermined criteria and/or rules. At region 424, the signal strength from the same tower indicated by bars A & B can represent an inference that user 402 carrying the mobile unit 404 is in motion and hence GPS 408 can be trusted. If the signal strength A & B being received from the same tower are identical or within a predetermined threshold, the subject innovation can subsequently infer that the user carrying the mobile unit 404 is in a static position and hence the GPS data should not be trusted.

Other websites can also be automatically accessed to obtain additional information regarding parameters that can affect signal strength; such as weather information from a weather website 420, including temperature, humidity and barometric pressure data, if provided for the location of the user. It is to be appreciated that many different types of rules (or policies) can be implemented to cause automatic searching and linking of website data sources for parameters affecting the signal strength. In a related aspect, the direction and speed of the user 402 can also be corroborated via motion analyzers that are associated with the mobile unit 404. If the user 402 should enter a GPS shadow, or it is determined from user course and speed that the user is about to enter the shadow, other data and operations can be processed. For example, a shadow mapping and log website 426 provides a database of shadow mappings that are associated with location of the user 402.

Figure 5:
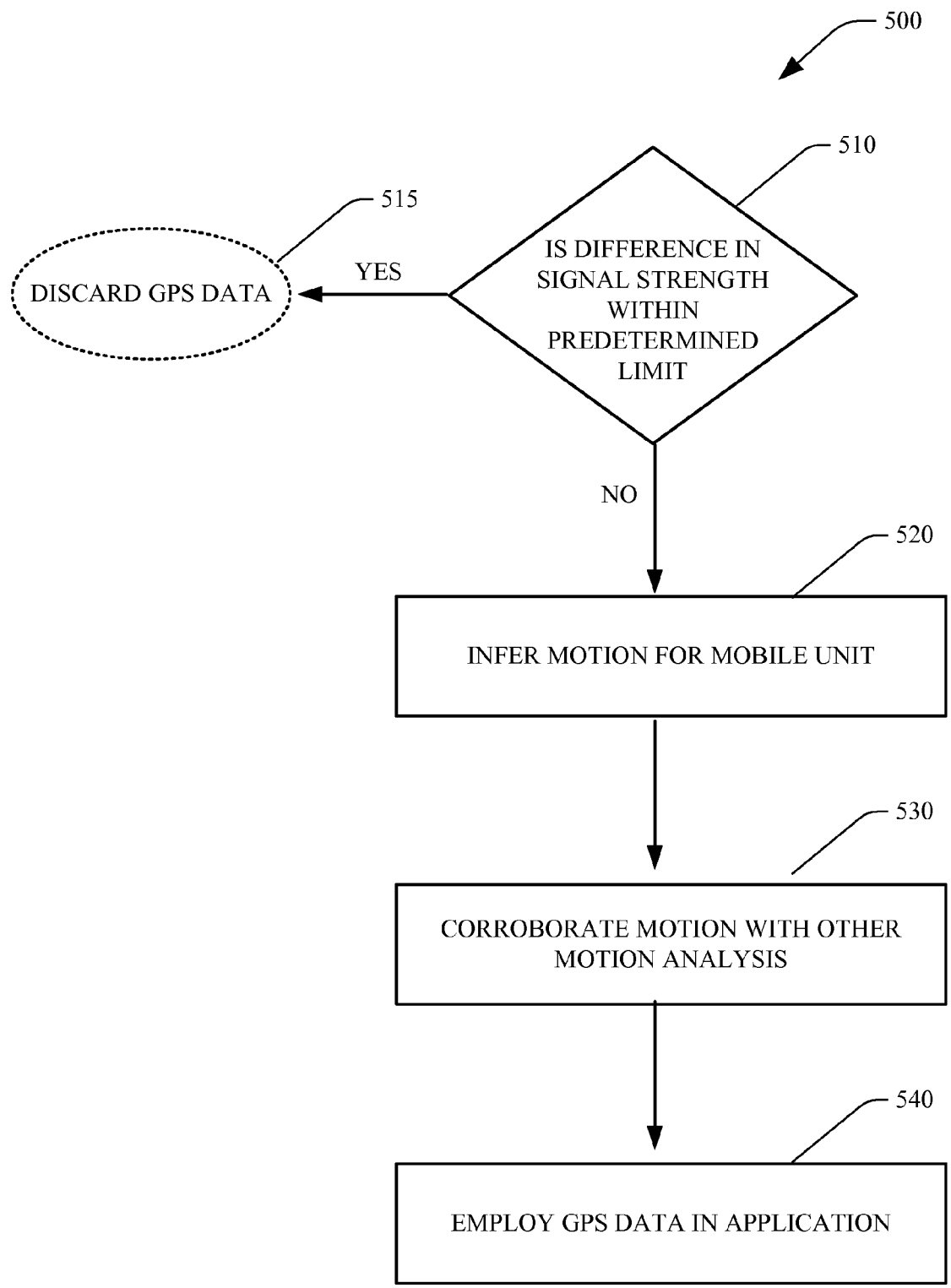
FIG. 5 illustrates a related methodology of reducing GPS errors according to a further aspect of the subject innovation.

FIG. 5 illustrates a related methodology 500 of mitigating errors in accordance with an aspect of the subject innovation. Initially and at 510 a difference in signal strength during two instances are verified to be within a predetermined threshold. If so, the methodology proceeds to act 515 wherein GPS data can be discarded since a static behavior or position can be detected for the mobile unit—(the GPS can indicate erratic motion within vicinity of the point where the mobile device has stopped or in static position, and hence errors are introduced.) Otherwise, the methodology 500 proceeds to act 520 wherein motion of the mobile unit can be inferred. Such inference can then be corroborated with other type of motion analysis associated with the mobile device, at 530. For example, other motion detector devices (e.g., accelerometers, speedometers, and the like) can be further be employed to detect motion and hence validate reliance on GPS data. Subsequently and at 540, the GPS data can be employed as input for applications verifying distances travelled.

Figure 6:
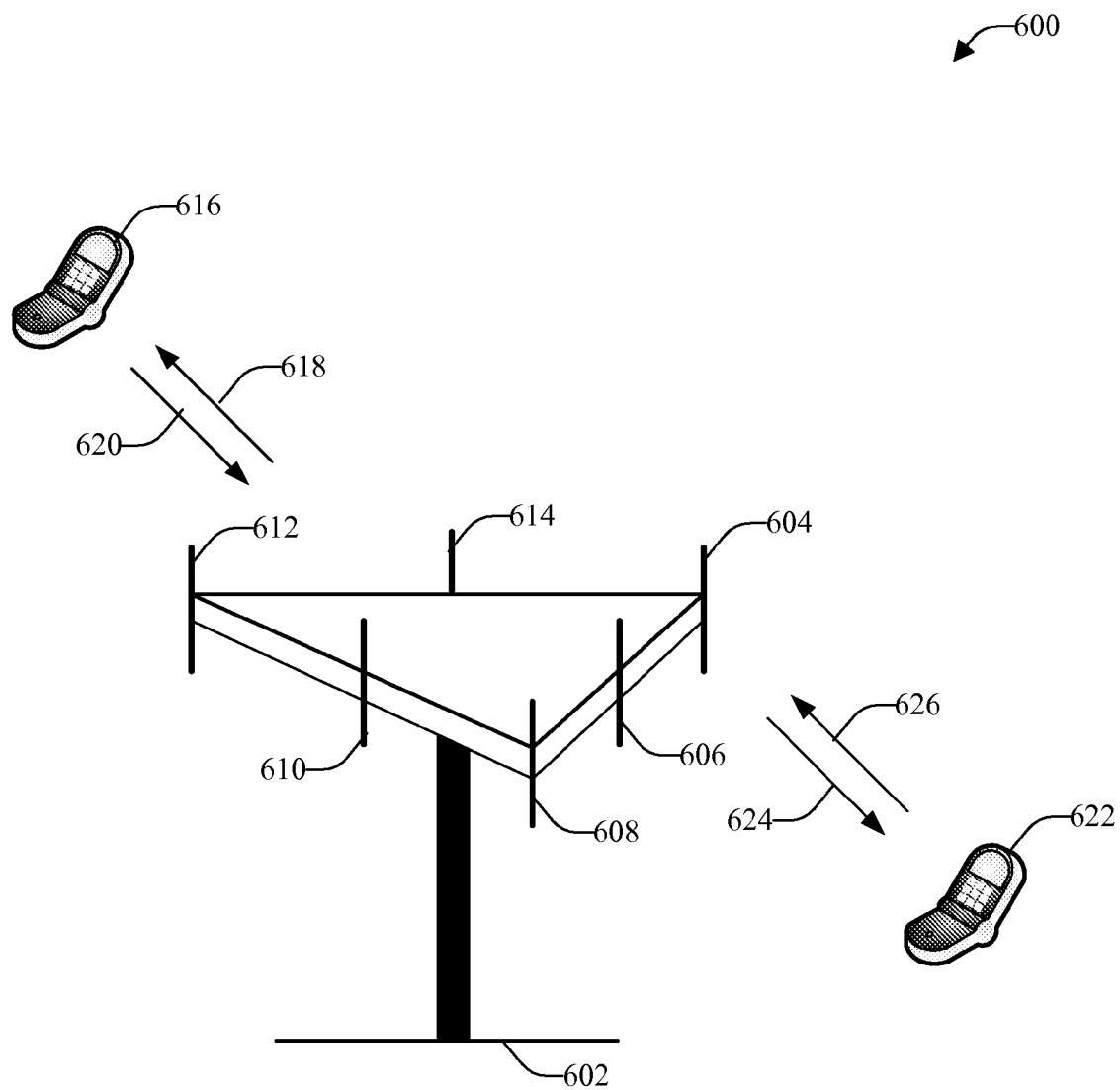
FIG. 6 illustrates a communication system that employs signal strength from multiple access wireless communication systems according to a further aspect.

FIG. 6 illustrates an exemplary system that employs signal strength from multiple access wireless communication system 600 to mitigate errors in GPS data for the mobile units 616 and 622. The wireless communication system 600 can include one or more towers or base stations in contact with one or more user devices. Each base station provides coverage for a plurality of sectors. A three-sector base station 602 is illustrated that includes multiple antenna groups, one including antennas 604 and 606, another including antennas 608 and 610, and a third including antennas 612 and 614. According to the figure, only two antennas are shown for each antenna group, however, more or fewer antennas may be utilized for each antenna group. Mobile device 616 is in communication with antennas 612 and 614, where antennas 612 and 614 transmit signals to mobile device 616 over forward link 618 and receive information from mobile device 616 over reverse link 620. Forward link (or downlink) refers to the communication link from the base stations to mobile devices, and the reverse link (or uplink) refers to the communication link from mobile devices to the base stations. Mobile device 622 is in communication with antennas 604 and 606, where antennas 604 and 606 transmit information to mobile device 622 over forward link 624 and receive information from mobile device 622 over reverse link 626. In a FDD system, for example, communication links might utilize different frequencies for communication. For example, forward link 618 might use a different frequency than the frequency utilized by reverse link 620.

Each group of antennas and/or the area in which they are designated to communicate can be referred to as a sector of base station 602. In one or more aspects, antenna groups each are designed to communicate to mobile devices in a sector or the areas covered by base station 602. A base station may be a fixed station used for communicating with the terminals. In communication over forward links 618 and 624, the transmitting antennas of base station 602 can utilize beamforming in order to improve a signal-to-noise ratio of forward links for the different mobile devices 616 and 622. As such, a constant signal strength received by the mobile unit 616 or 622 during a predetermined period can be inferred to indicate static (e.g., non-moving) mobile unit. Likewise, a change in signal strength during a predetermined time frame can be inferred to indicate that the mobile unit has in fact moved.

Figure 7:
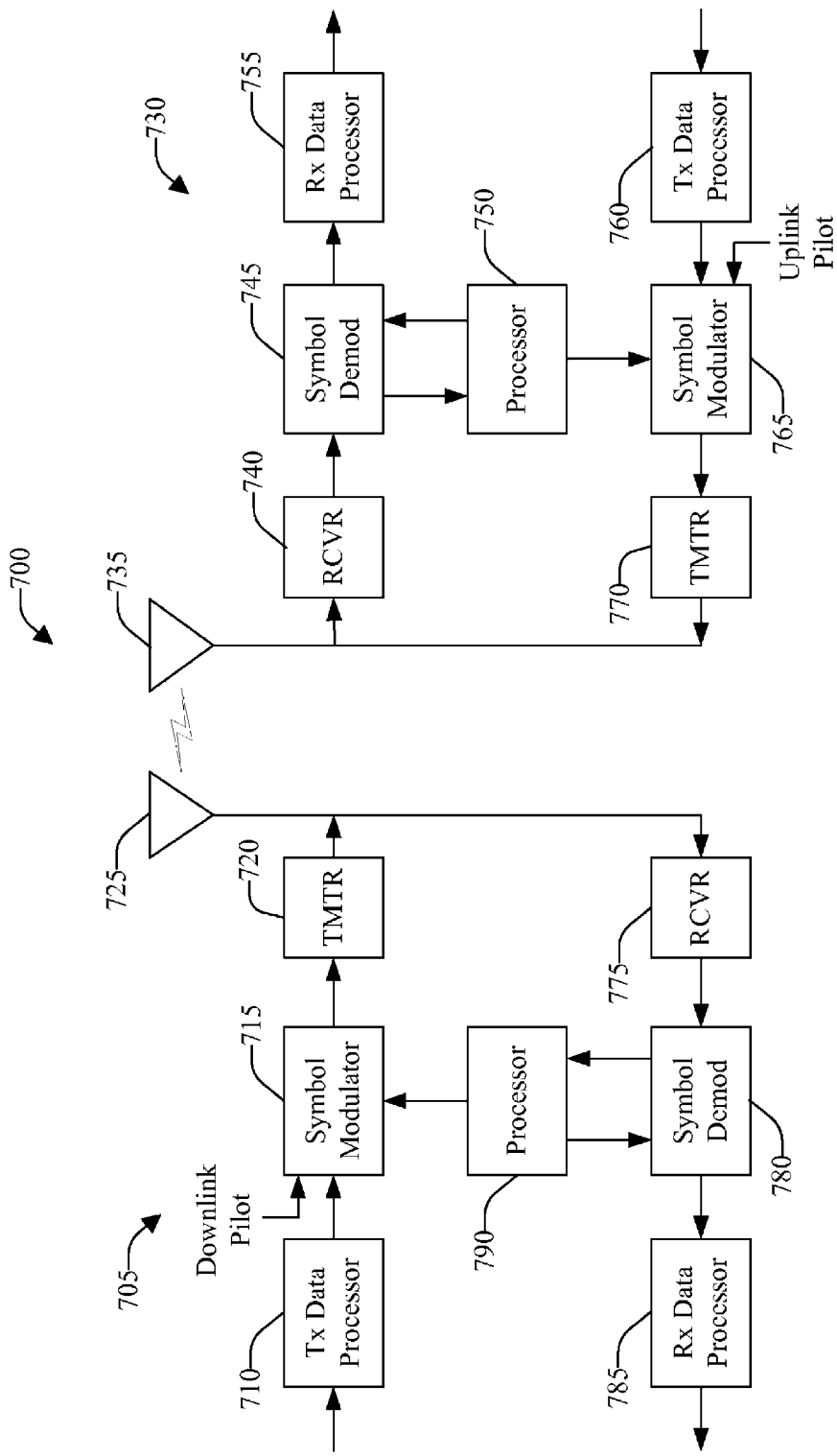
FIG. 7 illustrates a wireless communication system that employs signal strength for mitigation of errors.

FIG. 7 illustrates an exemplary wireless communication system 700 that mitigates errors in positioning systems by employing signal strengths of towers(s) to verify motion for the mobile unit. Wireless communication system 700 depicts one base station and one terminal for sake of brevity. However, it is to be appreciated that system 700 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

As illustrated in FIG. 7, on a downlink, at access point 705, a transmit (TX) data processor 710 receives, formats, codes, interleaves, and modulates (or symbol maps) traffic data and provides modulation symbols ("data symbols"). A symbol modulator 715 receives and processes the data symbols and pilot symbols and provides a stream of symbols. A symbol modulator 715 multiplexes data and pilot symbols and obtains a set of N transmit symbols. Each transmit symbol can be a data symbol, a pilot symbol, or a signal value of zero. The pilot symbols can be sent continuously in each symbol period. Moreover, the pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 720 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 725 to the terminals. At terminal 730, an antenna 735 receives the downlink signal and provides a received signal to a receiver unit (RCVR) 740. Receiver unit 740 conditions (e.g., filters, amplifies, and frequency downconverts) the received signal and digitizes the conditioned signal to obtain samples. A symbol demodulator 745 obtains N (an integer) received symbols and provides received pilot symbols to a processor 750 for channel estimation. Symbol demodulator 745 further receives a frequency response estimate for the downlink from processor 750, performs data demodulation on the received data symbols to obtain data symbol estimates (which are estimates of the transmitted data symbols), and provides the data symbol estimates to an RX data processor 755, which demodulates (i.e., symbol demaps), deinterleaves, and decodes the data symbol estimates to recover the transmitted traffic data. The processing by symbol demodulator 745 and RX data processor 755 is complementary to the processing by symbol modulator 715 and TX data processor 710, respectively, at access point 705.

On the uplink, a TX data processor 760 processes traffic data and provides data symbols. A symbol modulator 765 receives and multiplexes the data symbols with pilot symbols, performs modulation, and provides a stream of symbols. A transmitter unit 770 then receives and processes the stream of symbols to generate an uplink signal, which is transmitted by the antenna 735 to the access point 705.

At access point 705, the uplink signal from terminal 730 is received by the antenna 725 and processed by a receiver unit 775 to obtain samples. A symbol demodulator 780 then processes the samples and provides received pilot symbols and data symbol estimates for the uplink. An RX data processor 785 processes the data symbol estimates to recover the traffic data transmitted by terminal 730. A processor 790 performs channel estimation for each active terminal transmitting on the uplink.

Processors 790 and 750 direct (e.g., control, coordinate, manage, . . . ) operation at access point 705 and terminal 730, respectively. Respective processors 790 and 750 can be associated with memory units (not shown) that store program codes and data. Processors 790 and 750 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands can be shared among different terminals. The channel estimation techniques can be employed in cases where the pilot subbands for each terminal span the entire operating band (possibly except for the band edges). Such a pilot subband structure would be desirable to obtain frequency diversity for each terminal. It is to be appreciated that the techniques described herein can be implemented by various means. For example, such techniques can be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 790 and 750.

An exemplary code can include:

```
//Do this for each stationary signal source in the
vicinity
OnGPSSensorUpdate( )
{
        //Check received signal strength indicators...
    if (( CurrentSourceSignalValue == previousSignalValue)
    && (previousMaxValue== GetCurrentSignalSourceMAX( ))
    {
    //Do not trust the GPS read. There was either no
    movement according to the other signals and we have not
    swapped sources
    }
    else
    {
        //Either the source changed or there WAS movement
    according to the signal strength.
        Pos = Read      GPSSensor( ); // Either way, accept
    the current position!
```

The signal strength can be a received signal level or field strength; or be in the form of a relative/unit-less index that corresponds to magnitude of an electric field at a reference point (e.g., number of "bars" on a cell phone screen.) As such, a constant signal strength during a predetermined period can be inferred to indicate static (e.g., non-moving) mobile unit. Likewise, a change in signal strength during a predetermined time frame can be inferred to indicate that the mobile unit has moved. Such detection component and the comparator component can be part of the mobile unit, or can be positioned as part of a central control system that further employs triangulation procedures to infer whether the mobile unit is static or in motion. Such becomes important in applications that employ GPS data for verifying distances travelled as the GPS indicates erratic motion within vicinity of the point where the mobile device has stopped, and hence are introduced.

Figure 8:
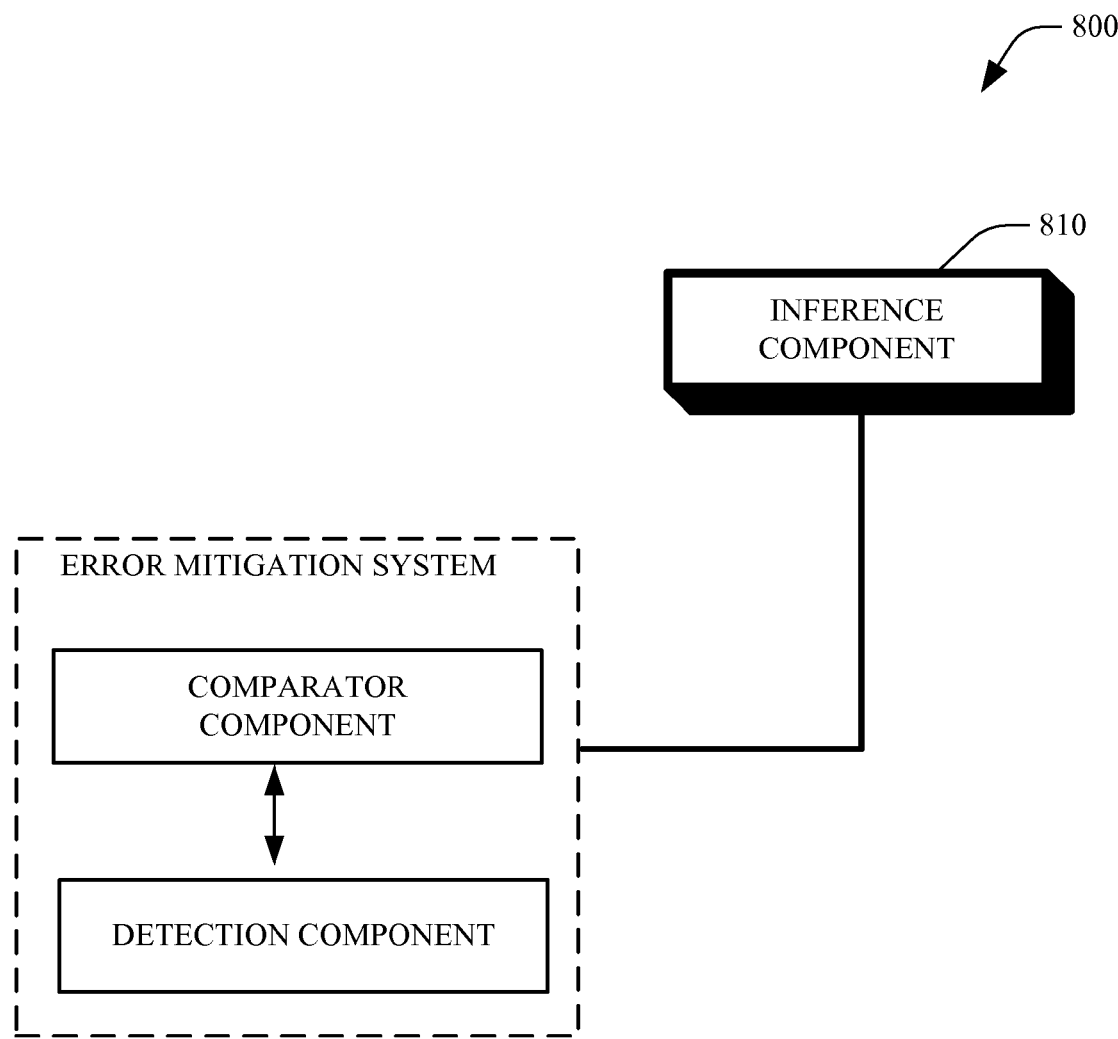
FIG. 8 illustrates an inference component that can facilitate inferring a static position of a mobile unit with GPS capabilities according to an aspect of the subject innovation.

FIG. 8 illustrates an artificial intelligence inference component 810 for correction of GPS according to an aspect of the subject innovation. For example, such can include supplying heuristics for cost estimation associated with vicinity selection. In a related aspect, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The inference component 810 can employ any of a variety of suitable AI-based schemes as described supra in connection with facilitating various aspects of the herein described invention. For example, a process for learning explicitly or implicitly when to discard GPS data can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

As used in herein, the terms "component," "system", "module" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
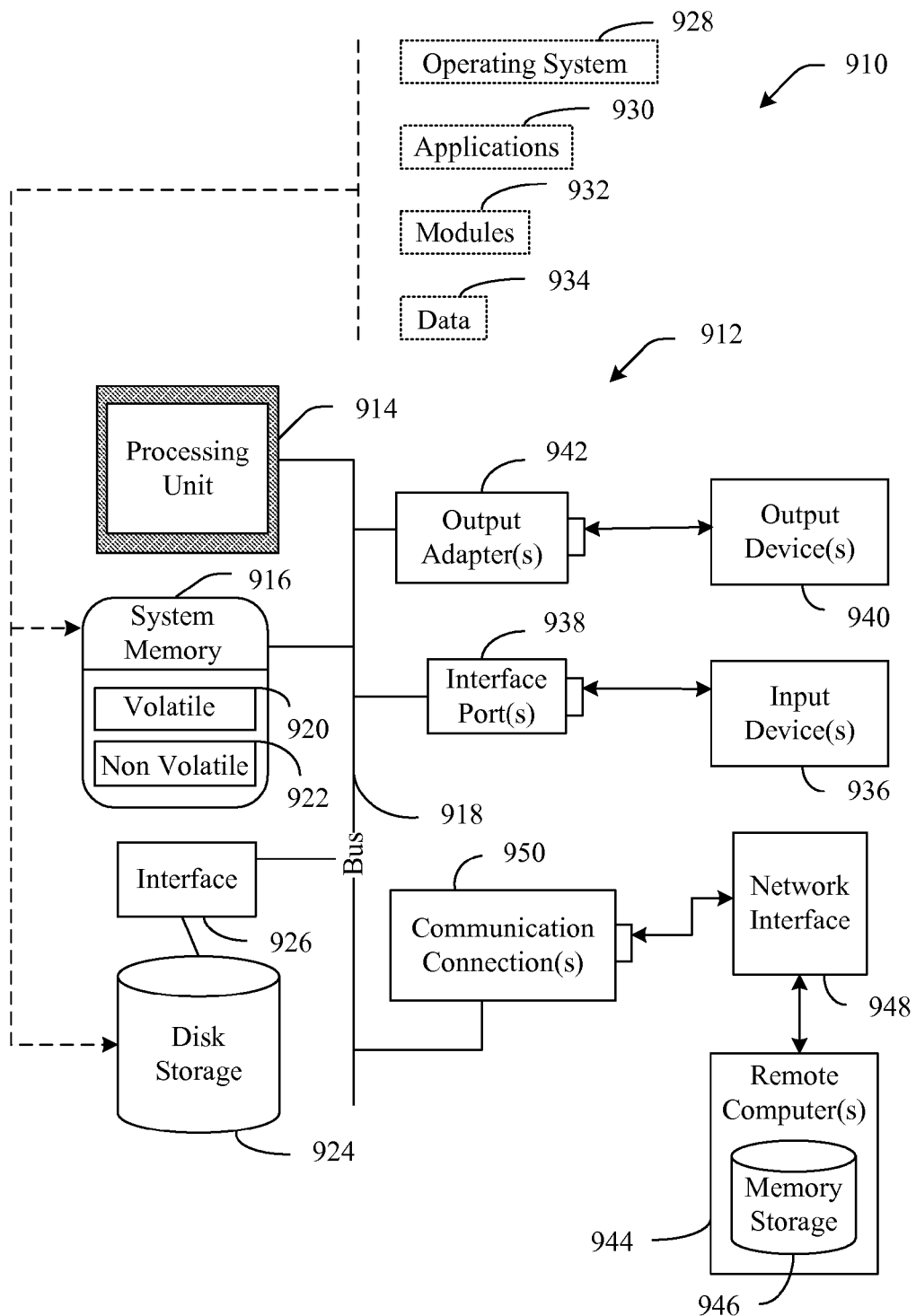
FIG. 9 is a schematic block diagram of a sample-computing environment that can be employed as part of mitigation GPS errors in accordance with an aspect of the subject innovation.
Figure 10:
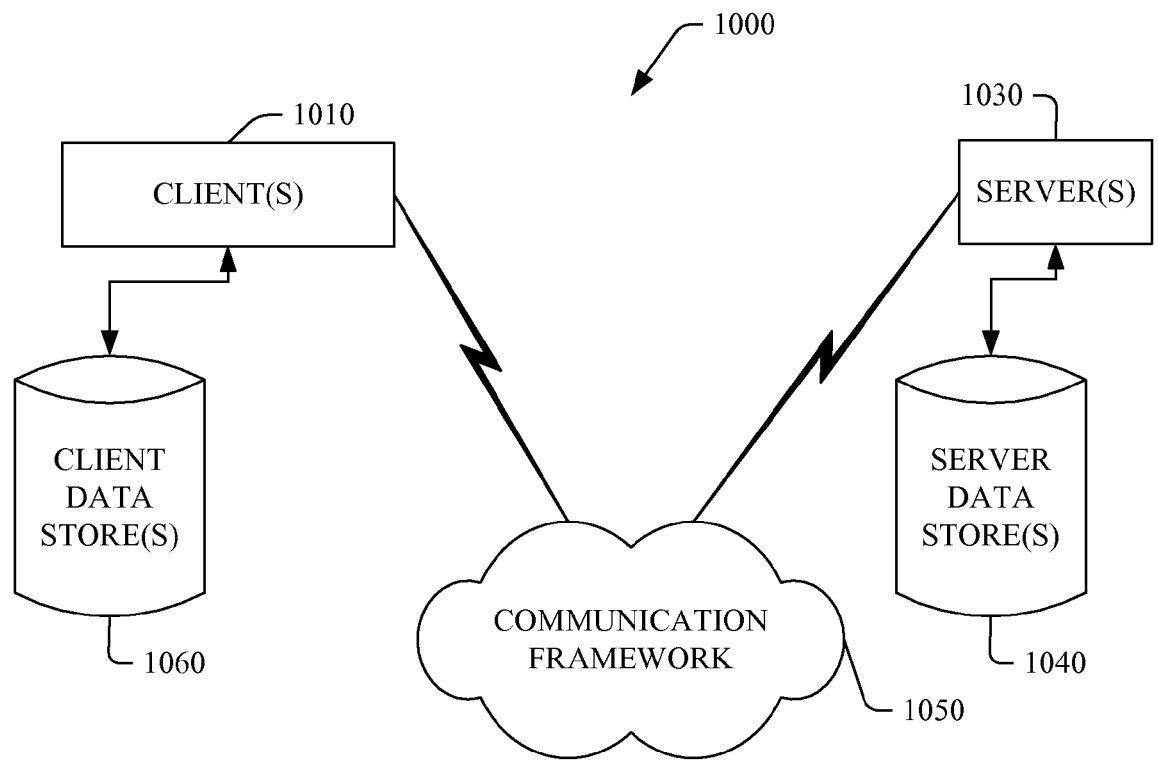
FIG. 10 illustrates an exemplary environment for implementing various aspects of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed as part of mitigating GPS errors in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. In a GPS tracking system that includes a mobile unit that is communicatively coupled to a communication network comprising a plurality of base stations providing wireless communication links to the mobile device, and wherein the mobile device is also communicatively coupled to a GPS satellite system, a computer-implemented method for verifying whether the mobile device is static and for evaluating whether to use or discard of the GPS positioning data being sent to the mobile device, the method comprising:
   receiving at the mobile device GPS data which is capable of being used to determine the geographic position of the mobile device at a first point in time;
   receiving at the mobile device GPS data which is capable of being used to determine the geographic position of the mobile device at a second point in time;
   selecting a base station that supplies a communication signal to the mobile device;
   detecting strength of the communication signal sent by the base station to the mobile device at said first point in time;
   detecting strength of the communication signal sent by the base station to the mobile device at said second point in time;
   comparing the signal strength between the communication signal sent by the base station to the mobile device at said first and second points of time; and
   if the compared signal strength has changed beyond a predetermined threshold amount, determining that the mobile device has moved and using the GPS data to verify location of the mobile device, but if the compared signal strength has not changed beyond the predetermined threshold amount, determining that the mobile device is stationary and discarding the GPS data.

2. The computer-implemented method of claim 1, wherein the mobile device includes one or more motion detector devices, and wherein the method further comprises analyzing data provided by the one or more motion detector devices to further validate whether the mobile device is static and if so, discarding the GPS data.

3. The computer-implemented method of claim 1 wherein said communication signal detected at said first and second points of time is comprised of at least one of a cellular telephone signal, a WiFi signal, a radio frequency signal or a digital television signal.

4. The computer-implemented method of claim 1 further comprising accessing a shadow mapping and log that records GPS shadows.

5. The computer-implemented method of claim 1 further comprising accessing one or more data stores that maintain parameters affecting signal strength.

6. The computer-implemented method of claim 1 wherein the mobile device comprises a comparator component and wherein comparator component performs
   comparing the signal strength between the communication signal sent by the base station to the mobile device at said first and second points of time; and
   if the compared signal strength has changed beyond a predetermined threshold amount, determining that the mobile device has moved and using the GPS data to verify location of the mobile device, but if the compared signal strength has not changed beyond the predetermined threshold amount, determining that the mobile device is stationary and discarding the GPS data.

7. The computer-implemented method of claim 1 wherein the mobile device comprises a location detection component and wherein the location detection component performs
receiving at the mobile device GPS data which determines the geographic position of the mobile device at a first point in time;
receiving at the mobile device GPS data which determines the geographic position of the mobile device at a second point in time.

8. The computer-implemented method of claim 1, wherein comparing the signal strength between the communication signal sent by the base station to the mobile device at said first and second points of time, and if the compared signal strength has changed beyond a predetermined threshold amount, determining that the mobile device has moved and using the GPS data to verify location of the mobile device, but if the compared signal strength has not changed beyond the predetermined threshold amount, determining that the mobile device is stationary and discarding the GPS data are both performed at a server of the communication network.

9. The computer-implemented method of claim 1, wherein the mobile device comprises an inference component which implements an artificial intelligence scheme to correct GPS location.

10. In a GPS tracking system that includes a mobile unit that is communicatively coupled to a communication network comprising a plurality of base stations providing wireless communication links to the mobile device, and wherein the mobile device is also communicatively coupled to a GPS satellite system, a physical storage medium containing computer-executable instruction for implementing a computer-implemented method for verifying whether the mobile device is static and for whether to use or discard accuracy of the GPS positioning data being sent to the mobile device, and wherein the computer-implemented method comprises:
receiving at the mobile device GPS data which is capable of being used to determine the geographic position of the mobile device at a first point in time;
receiving at the mobile device GPS data which is capable of being used to determine the geographic position of the mobile device at a second point in time;
selecting a base station that supplies a communication signal to the mobile device;
detecting strength of the communication signal sent by the base station to the mobile device at said first point in time;
detecting strength of the communication signal sent by the base station to the mobile device at said second point in time;
comparing the signal strength between the communication signal sent by the base station to the mobile device at said first and second points of time; and
if the compared signal strength has changed beyond a predetermined threshold amount, determining that the mobile device has moved and processing said received GPS data at the first and second points of time to locate the mobile device, but if the compared signal strength has not changed beyond the predetermined threshold amount, determining that the mobile device is stationary and discarding the GPS data.

11. The computer program product of claim 10, wherein the mobile device includes one or more motion detector devices, and wherein the method further comprises analyzing data provided by the one or more motion detector devices to further validate whether the mobile device is static and if so, discarding the GPS data.

12. The computer program product of claim 10 wherein said communication signal detected at said first and second points of time is comprised of at least one of a cellular telephone signal, a WiFi signal, a radio frequency signal or a digital television signal.

13. The computer program product of claim 10 further comprising accessing a shadow mapping and log that records GPS shadows.

14. The computer program product of claim 10 further comprising accessing one or more data stores that maintain parameters affecting signal strength.

15. The computer program product of claim 10 wherein the mobile device comprises a comparator component and wherein comparator component performs
comparing the signal strength between the communication signal sent by the base station to the mobile device at said first and second points of time; and
if the compared signal strength has changed beyond a predetermined threshold amount, determining that the mobile device has moved and using the GPS data to verify location of the mobile device, but if the compared signal strength has not changed beyond the predetermined threshold amount, determining that the mobile device is stationary and discarding the GPS data.

16. The computer program product of claim 10 wherein the mobile device comprises a location detection component and wherein the location detection component performs receiving at the mobile device GPS data which determines the geographic position of the mobile device at a first point in time;
receiving at the mobile device GPS data which determines the geographic position of the mobile device at a second point in time.

17. The computer program product of claim 10, wherein comparing the signal strength between the communication signal sent by the base station to the mobile device at said first and second points of time, and if the compared signal strength has changed beyond a predetermined threshold amount, determining that the mobile device has moved and using the GPS data to verify location of the mobile device, but if the compared signal strength has not changed beyond the predetermined threshold amount, determining that the mobile device is stationary and discarding the GPS data are both performed at a server of the communication network.

18. The computer program product of claim 10, wherein the mobile device comprises an inference component which implements an artificial intelligence scheme to correct GPS location.

19. In a GPS tracking system that includes a mobile unit that is communicatively coupled to a communication network comprising a plurality of base stations providing wireless communication links to the mobile device, and wherein the mobile device is also communicatively coupled to a GPS satellite system, a physical storage medium containing computer-executable instruction for implementing a computer-implemented method for verifying whether the mobile device is static and for evaluating whether to use or discard of the GPS positioning data being sent to the mobile device, and wherein the computer-implemented method comprises:
receiving at the mobile device GPS data which is capable of being used to determine the geographic position of the mobile device at a first point in time;
receiving at the mobile device GPS data which is capable of being used to determine the geographic position of the mobile device at a second point in time;
selecting a base station that supplies a communication signal to the mobile device;

detecting strength of the communication signal sent by the base station to the mobile device at said first point in time;
detecting strength of the communication signal sent by the base station to the mobile device at said second point in time;
comparing the signal strength between the communication signal sent by the base station to the mobile device at said first and second points of time;
if the compared signal strength has changed beyond a predetermined threshold amount, determining that the mobile device has moved and processing said received GPS data at the first and second points of time to locate the mobile device, but if the compared signal strength has not changed beyond the predetermined threshold amount, determining that the mobile device is stationary and discarding the GPS data;
analyzing data provided by one or more motion detector devices included at the mobile device to further validate whether the mobile device is static and if so, discarding the GPS data; and
implementing an artificial intelligence scheme to correct GPS location.

* * * * *